United States Patent
Sun et al.

(10) Patent No.: US 10,165,517 B2
(45) Date of Patent: Dec. 25, 2018

(54) POWER ALLOCATION METHOD AND COMMUNICATIONS DEVICE

(71) Applicant: HUAWEI TECHNOLOGIES CO., LTD., Shenzhen, Guangdong (CN)

(72) Inventors: Wei Sun, Beijing (CN); Yongxia Lyu, Beijing (CN); Ronghui Wen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/630,229

(22) Filed: Jun. 22, 2017

(65) Prior Publication Data
US 2017/0289918 A1    Oct. 5, 2017

Related U.S. Application Data

(63) Continuation of application No. PCT/CN2014/094698, filed on Dec. 23, 2014.

(51) Int. Cl.
*H04B 7/00*     (2006.01)
*H04W 52/14*    (2009.01)
(Continued)

(52) U.S. Cl.
CPC ....... *H04W 52/143* (2013.01); *H04W 52/325* (2013.01); *H04W 52/30* (2013.01)

(58) Field of Classification Search
CPC ............ H04W 52/146; H04W 52/242; H04W 52/241; H04W 52/32; H04W 52/322
(Continued)

(56) References Cited

U.S. PATENT DOCUMENTS 8,588,205 B2 * 11/2013 Chang ................ H04W 52/241
                                                    370/342
9,532,344 B2 * 12/2016 Park .................... H04W 72/042
(Continued)

FOREIGN PATENT DOCUMENTS

CN      103327597 A     9/2013
CN      103826279 A     5/2014
(Continued)

OTHER PUBLICATIONS

International Search Report, dated Sep. 28, 2015, in International Application No. PCT/CN2014/094698 (4 pp.).
(Continued)

*Primary Examiner* — Sonny Trinh
(74) *Attorney, Agent, or Firm* — Stass & Halsey LLP

(57) ABSTRACT

Embodiments of the present invention provide a power allocation method and a communications device. The power allocation method includes: determining, by a first communications device, a first power control parameter group, where the first power control parameter group includes information used to indicate a transmit power of the first communications device in a first-type subframe, and sending, by the first communications device, a signal only on a downlink frequency resource in the first-type subframe; and determining, by the first communications device, a second power control parameter group, where the second power control parameter group includes information used to indicate a transmit power of the first communications device in a second-type subframe, and sending, by the first communications device, signals on both a downlink frequency resource and an uplink frequency resource in the second-type subframe.

17 Claims, 4 Drawing Sheets

A first communications device determines a first power control parameter group, where the first power control parameter group includes information used to indicate a transmit power of the first communications device in a first-type subframe, and the first communications device sends a signal only on a downlink frequency resource in the first-type subframe — S601

The first communications device determines a second power control parameter group, where the second power control parameter group includes information used to indicate a transmit power of the first communications device in a second-type subframe, and the first communications device sends signals on both a downlink frequency resource and an uplink frequency resource in the second-type subframe — S602

(51) Int. Cl.
*H04W 52/32* (2009.01)
*H04W 52/30* (2009.01)

(58) Field of Classification Search
USPC .................................. 455/522, 13.4, 127.1
See application file for complete search history.

(56) References Cited

U.S. PATENT DOCUMENTS

| | | | | |
|---|---|---|---|---|
| 9,680,590 | B2* | 6/2017 | Park | H04J 3/1694 |
| 9,832,732 | B2* | 11/2017 | Ouchi | H04W 52/146 |
| 9,832,734 | B2* | 11/2017 | Seo | H04W 52/146 |
| 9,832,737 | B2* | 11/2017 | Ouchi | H04W 52/242 |
| 2015/0173024 | A1* | 6/2015 | Seo | H04W 52/146 |
| | | | | 370/329 |
| 2017/0055223 | A1* | 2/2017 | Shao | H04W 24/02 |

FOREIGN PATENT DOCUMENTS

| | | |
|---|---|---|
| EP | 2665305 A1 | 11/2013 |
| WO | 2014/018333 A2 | 1/2014 |

OTHER PUBLICATIONS

International Search Report dated Sep. 28, 2015 in corresponding International Patent Application No. PCT/CN2014/094698.
Extended European Search Report dated Oct. 12, 2017 in corresponding European Patent Application No. 14908724.9.
"$3^{rd}$ Generation Partnership Project; Technical Specification Group Radio Access Network; Evolved Universal Terrestrial Radio Access (E-UTRA); Physical layer procedures (Release 12)," 3GPP Standard; 3GPP TS 36.213, $3^{rd}$ Generation Partnership Project (3GPP), Mobile Competence Centre; 650, Route Des Lucioles; F-06921 Sophia-Antipolis Cedex; France, vol. RAN WG1, No. V12.3.0, Sep. 26, 2014, pp. 1-212, XP050926112.
3rd Generation Partnership Project; Technical Specification Group Radio Access Network; Evolved Universal Terrestrial Radio Access (E-UTRA); Physical layer procedures (Release 9), 3GPP TS 36.213 V9.3.0 (Sep. 2010), pp. 1-80.
Office Action, dated Apr. 30, 2018, in Canadian Application No. 2972110 (5 pp.).

* cited by examiner

POWER ALLOCATION METHOD AND COMMUNICATIONS DEVICE

CROSS-REFERENCE TO RELATED APPLICATIONS

This application is a continuation of International Application No. PCT/CN2014/094698, filed on Dec. 23, 2014, the disclosure of which is hereby incorporated by reference in its entirety.

TECHNICAL FIELD

Embodiments of the present invention relate to the field of wireless communications technologies, and in particular, to a power allocation method and a communications device.

BACKGROUND

In a Frequency Division Duplexing (FDD) wireless communications system, different frequencies are separately used in uplink transmission and downlink transmission. In a conventional voice communications service, volumes of data that needs to be transmitted in uplink and downlink services are basically the same, and therefore quantities of uplink and downlink transmission resources allocated in the FDD system are the same.

However, with rapid growth of wireless broadband services, multiple service types such as online video and network download are introduced into wireless communications, and a feature of these services is that a data volume of a downlink service is far greater than a data volume of an uplink service. This results in a situation in which there are a lot of idle uplink frequency resources while downlink frequency resources are in shortage on a network. Therefore, currently a dynamic spectrum sharing (DSS) technology is put forward. The DSS technology allows a base station to send a downlink signal on an uplink frequency resource, thereby resolving the problem in the FDD system that uplink frequency resources are idle while downlink frequency resources are in shortage.

In a wireless communications system, out of purposes such as saving energy and avoiding inter-base station interference, maximum transmit powers of base stations are generally limited. For example, in a Long Term Evolution (LTE) system, a maximum transmit power of a macro base station is 46 dbm, and a maximum transmit power of a low-power node (for example, a relay station, a pico base station, or a home base station) is 30 dbm or 24 dbm. However, in the current FDD system, a maximum transmit power of a base station is specified according to only downlink frequency resources. When the DSS technology is used, a base station can send downlink signals on all downlink frequency resources, and sends downlink signals by using some uplink frequency resources. If the base station not only sends a downlink signal but also sends an uplink signal in a same subframe, how the base station coordinates powers for sending the downlink signal on the uplink frequency resource and the downlink frequency resource is not considered.

Therefore, when the DSS technology is used, how a base station coordinates powers for sending a downlink signal on an uplink frequency resource and a downlink frequency resource is an urgent problem to be resolved.

SUMMARY

Embodiments of the present invention provide a power allocation method and a communications device, which are used to coordinate transmit powers on an uplink frequency resource and a downlink frequency resource.

According to a first aspect, a communications device is provided, including: a processing module and a sending module, where the processing module is configured to: determine a first power control parameter group, where the first power control parameter group includes information used to indicate a transmit power of the sending module in a first-type subframe, and the sending module sends a signal only on a downlink frequency resource in the first-type subframe; and determine a second power control parameter group, where the second power control parameter group includes information used to indicate a transmit power of the sending module in a second-type subframe, and the sending module sends signals on both a downlink frequency resource and an uplink frequency resource in the second-type subframe.

With reference to the first aspect, in a first possible implementation manner of the first aspect, the second power control parameter group includes a third power control parameter group and a fourth power control parameter group, where the third power control parameter group includes information used to indicate a transmit power of the sending module on a downlink frequency resource in the second-type subframe, and the fourth power control parameter group includes information used to indicate a transmit power of the sending module on an uplink frequency resource in the second-type subframe.

With reference to the first possible implementation manner of the first aspect, in a second possible implementation manner of the first aspect, the third power control parameter group includes information used to indicate a transmit power of the sending module for a data signal in a symbol that includes a reference signal and that is on the downlink frequency resource in the second-type subframe, and information used to indicate a transmit power of the sending module for a data signal in a symbol that does not include a reference signal and that is on the downlink frequency resource in the second-type subframe.

With reference to the first or the second possible implementation manner of the first aspect, in a third possible implementation manner of the first aspect, if a reference signal is included on the uplink frequency resource in the second-type subframe, the fourth power control parameter group includes: information used to indicate a transmit power of the sending module for a reference signal on the uplink frequency resource in the second-type subframe, information used to indicate a transmit power of the sending module for a data signal in a symbol that includes a reference signal and that is on the uplink frequency resource in the second-type subframe, and information used to indicate a transmit power of the sending module for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the sending module for a data signal on the uplink frequency resource in the second-type subframe.

With reference to any possible implementation manner of the first aspect to the third possible implementation manner of the first aspect, in a fourth possible implementation manner of the first aspect, the transmit power of the sending module in the first-type subframe is equal to the transmit power of the sending module in the second-type subframe.

With reference to any possible implementation manner of the first to the third possible implementation manner of the first aspect, in a fifth possible implementation manner of the first aspect, the transmit power of the sending module in the first-type subframe is equal to the transmit power of the sending module on the downlink frequency resource in the second-type subframe; and the third power control parameter group is the same as the first power control parameter group.

With reference to the fifth possible implementation manner of the first aspect, in a sixth possible implementation manner of the first aspect, if a reference signal is included on the uplink frequency resource in the second-type subframe, the fourth power control parameter group includes: the information used to indicate a transmit power of the sending module for a reference signal on the uplink frequency resource in the second-type subframe, or the information used to indicate a transmit power of the sending module for a reference signal on the uplink frequency resource in the second-type subframe and information used to indicate a difference from or a ratio to a transmit power of the sending module for a reference signal in the first-type subframe; or if a reference signal is not included on the uplink frequency resource in the second-type subframe, the fourth power control parameter group includes: the information used to indicate a transmit power of the sending module for a data signal on the uplink frequency resource in the second-type subframe, or the information used to indicate a transmit power of the sending module for a data signal on the uplink frequency resource in the second-type subframe and information used to indicate a difference from or a ratio to a transmit power of the sending module for a data signal in the first-type subframe.

With reference to any possible implementation manner of the first aspect to the sixth possible implementation manner of the first aspect, in a seventh possible implementation manner of the first aspect, the first power control parameter group includes: information used to indicate a transmit power of the sending module for a data signal in a symbol that includes a reference signal and that is in the first-type subframe, and information used to indicate a transmit power of the sending module for a data signal in a symbol that does not include a reference signal and that is in the first-type subframe; or the first power control parameter group includes: information used to indicate a transmit power of the sending module for a reference signal in the first-type subframe, information used to indicate a transmit power of the sending module for a data signal in a symbol that includes a reference signal and that is in the first-type subframe, and information used to indicate a transmit power of the sending module for a data signal in a symbol that does not include a reference signal and that is in the first-type subframe.

With reference to any possible implementation manner of the first aspect to the seventh possible implementation manner of the first aspect, in an eighth possible implementation manner of the first aspect, the sending module is further configured to: send the first power control parameter group to a second communications device; and send the second power control parameter group to the second communications device.

According to a second aspect, a communications device is provided, including:

a receiving module, configured to: receive a first power control parameter group sent by a first communications device, where the first power control parameter group includes information used to indicate a transmit power of the first communications device in a first-type subframe, and the first communications device sends a signal only on a downlink frequency resource in the first-type subframe; and receive a second power control parameter group sent by the first communications device, where the second power control parameter group includes information used to indicate a transmit power of the first communications device in a second-type subframe, and the first communications device sends signals on both a downlink frequency resource and an uplink frequency resource in the second-type subframe; and a processing module, configured to: determine the transmit power of the first communications device in the first-type subframe; and determine the transmit power of the first communications device in the second-type subframe.

With reference to the second aspect, in a first possible implementation manner of the second aspect, the second power control parameter group includes a third power control parameter group and a fourth power control parameter group, where the third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

With reference to the first possible implementation manner of the second aspect, in a second possible implementation manner of the second aspect, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

With reference to the first or the second possible implementation manner of the second aspect, in a third possible implementation manner of the second aspect, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

With reference to any possible implementation manner of the second aspect to the third possible implementation manner of the second aspect, in a fourth possible implementation manner of the second aspect, the transmit power of the first communications device in the first-type subframe is equal to the transmit power of the first communications device in the second-type subframe.

With reference to any possible implementation manner of the first to the third possible implementation manner of the second aspect, in a fifth possible implementation manner of the second aspect, the transmit power of the first communications device in the first-type subframe is equal to the transmit power of the first communications device on the downlink frequency resource in the second-type subframe; and the third power control parameter group is the same as the first power control parameter group.

With reference to the fifth possible implementation manner of the second aspect, in a sixth possible implementation manner of the second aspect, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

With reference to any possible implementation manner of the second aspect to the sixth possible implementation manner of the second aspect, in a seventh possible implementation manner of the second aspect, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

According to a third aspect, a power allocation method is provided, including:

determining, by a first communications device, a first power control parameter group, where the first power control parameter group includes information used to indicate a transmit power of the first communications device in a first-type subframe, and sending, by the first communications device, a signal only on a downlink frequency resource in the first-type subframe; and determining, by the first communications device, a second power control parameter group, where the second power control parameter group includes information used to indicate a transmit power of the first communications device in a second-type subframe, and sending, by the first communications device signals on both a downlink frequency resource and an uplink frequency resource in the second-type subframe.

With reference to the third aspect, in a first possible implementation manner of the third aspect, the second power control parameter group includes a third power control parameter group and a fourth power control parameter group, where the third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

With reference to the first possible implementation manner of the third aspect, in a second possible implementation manner of the third aspect, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

With reference to the first or the second possible implementation manner of the third aspect, in a third possible implementation manner of the third aspect, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

With reference to any possible implementation manner of the third aspect to the third possible implementation manner of the third aspect, the transmit power of the first communications device in the first-type subframe is equal to the transmit power of the first communications device in the second-type subframe.

With reference to any possible implementation manner of the first to the third possible implementation manner of the third aspect, in a fifth possible implementation manner of the third aspect, the transmit power of the first communications device in the first-type subframe is equal to the transmit power of the first communications device on the downlink frequency resource in the second-type subframe; and the third power control parameter group is the same as the first power control parameter group.

With reference to the fifth possible implementation manner of the third aspect, in a sixth possible implementation manner of the third aspect, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

With reference to any possible implementation manner of the third aspect to the sixth possible implementation manner of the third aspect, in a seventh possible implementation manner of the third aspect, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

With reference to any possible implementation manner of the third aspect to the seventh possible implementation manner of the third aspect, in an eighth possible implementation manner of the third aspect, the method further includes:

sending, by the first communications device, the first power control parameter group to a second communications device; and sending, by the first communications device, the second power control parameter group to the second communications device.

According to a fourth aspect, a power allocation method is provided, including:

receiving, by a second communications device, a first power control parameter group sent by a first communications device, where the first power control parameter group includes information used to indicate a transmit power of the first communications device in a first-type subframe, and the first communications device sends a signal only on a downlink frequency resource in the first-type subframe; and receiving, by the second communications device, a second power control parameter group sent by the first communications device, where the second power control parameter group includes information used to indicate a transmit power of the first communications device in a second-type subframe, and the first communications device sends signals on both a downlink frequency resource and an uplink frequency resource in the second-type subframe;

determining, by the second communications device, the transmit power of the first communications device in the first-type subframe; and determining, by the second communications device, the transmit power of the first communications device in the second-type subframe.

With reference to the fourth aspect, in a first possible implementation manner of the fourth aspect, the second power control parameter group includes a third power control parameter group and a fourth power control parameter group, where the third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

With reference to the first possible implementation manner of the fourth aspect, in a second possible implementation manner of the fourth aspect, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

With reference to the first or the second possible implementation manner of the fourth aspect, in a third possible implementation manner of the fourth aspect, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

With reference to any possible implementation manner of the fourth aspect to the third possible implementation manner of the fourth aspect, in a fourth possible implementation manner of the fourth aspect, the transmit power of the first communications device in the first-type subframe is equal to the transmit power of the first communications device in the second-type subframe.

With reference to any possible implementation manner of the first to the third possible implementation manner of the fourth aspect, in a fifth possible implementation manner of the fourth aspect, the transmit power of the first communications device in the first-type subframe is equal to the transmit power of the first communications device on the downlink frequency resource in the second-type subframe; and the third power control parameter group is the same as the first power control parameter group.

With reference to the fifth possible implementation manner of the fourth aspect, in a sixth possible implementation manner of the fourth aspect, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

With reference to any possible implementation manner of the fourth aspect to the sixth possible implementation manner of the fourth aspect, in a seventh possible implementation manner of the fourth aspect, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

By means of the power allocation method and the communications device that are provided in the embodiments of the present invention, a first power control parameter group and a second power control parameter group are determined, where the first power control parameter group includes information used to indicate a transmit power of the communications device in a first-type subframe, and the second power control parameter group includes information used to indicate a transmit power of the communications device in a second-type subframe, the communications device sends a signal only on a downlink frequency resource in the first-type subframe, and the communications device sends signals on both a downlink frequency resource and an uplink frequency resource in the second-type subframe, so that the communications device can determine signal transmit powers in different types of subframes, and transmit powers of the communications device on an uplink frequency resource and a downlink frequency resource are coordinated.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
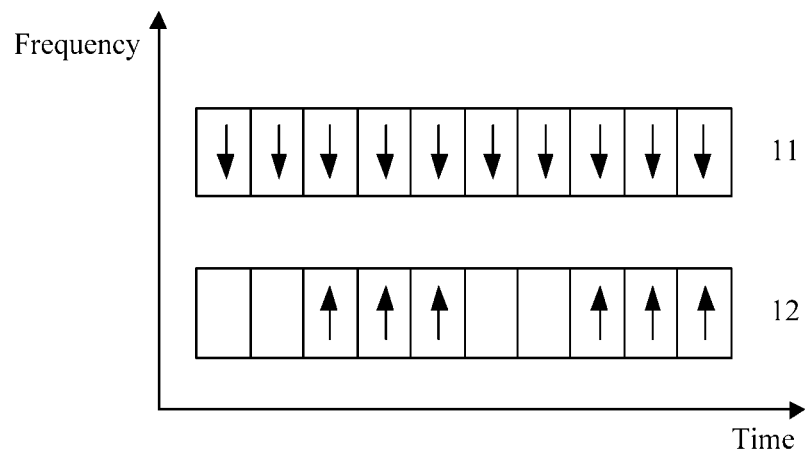
FIG. 1 is a schematic diagram of time-frequency resources when a DSS technology is not used in an FDD system.

FIG. 1 is a schematic diagram of time-frequency resources when a DSS technology is not used in an FDD system. As shown in FIG. 1, in FIG. 1, the x-axis represents time, and the y-axis represents frequency. A sequence 11 represents a downlink frequency resource, a sequence 12 represents an uplink frequency resource, and each cell in the sequence 11 and the sequence 12 represents a frequency resource in one subframe. In FIG. 1, quantities of subframes in the sequence 11 and the sequence 12 are only examples in the figure, and a proportion of the quantity of uplink subframes in the sequence 12 to the quantity of downlink subframes in the sequence 11 is determined according to a system traffic volume. A downlink service data volume is far larger than an uplink service data volume, and therefore uplink frequency resources in some subframes are not used. It can be seen from FIG. 1 that, each subframe in the sequence 11 is used to send a downlink signal. However, in the sequence 12, only some subframes are used to send uplink signals, and the other subframes are idle. This obviously causes a waste of frequency resources.

In a heterogeneous network architecture, there are two types of base stations: a macro (Macro) base station and a pico base station. The macro base station is used for coverage, and the pico base station is configured to enhance an access capability of a hotspot area. To avoid interference, the macro base station does not send a downlink signal on an uplink frequency resource, and the pico base station may send downlink signals in some subframes on the uplink frequency resource, so that a problem that downlink frequency resources are in shortage while uplink frequency resources are wasted can be resolved. An uplink traffic volume on uplink frequency resources in the pico base station is small, and originally there are idle uplink resources. Therefore, if the pico base station sends a downlink signal in some idle subframes on the uplink frequency resources, a loss of the uplink traffic volume is not caused.

Figure 2:
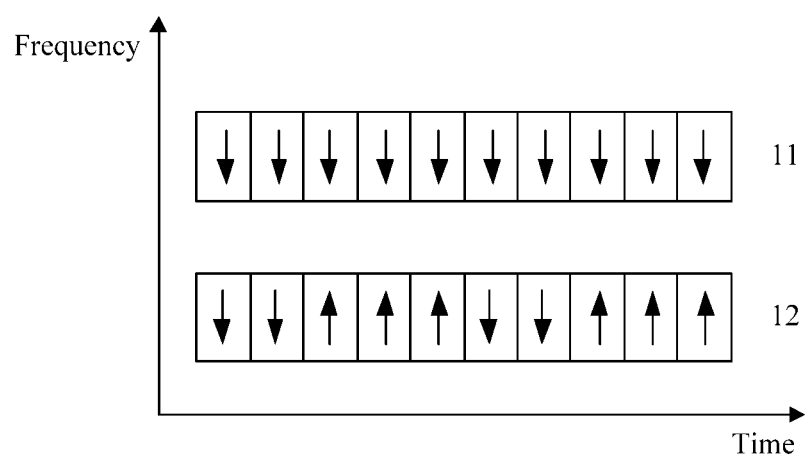
FIG. 2 is a schematic diagram of time-frequency resources when a DSS technology is used in an FDD system.

FIG. 2 is a schematic diagram of time-frequency resources when a DSS technology is used in an FDD system. As shown in FIG. 2, on the basis of the schematic diagram of the time-frequency resources shown in FIG. 1, each subframe in the sequence 11 is still used to send a downlink signal, and some subframes in the sequence 12 are used to send uplink signals. However, in the schematic diagram of the time-frequency resources shown in FIG. 2, an idle subframe is used to send a downlink signal. In this way, a quantity of available downlink resources is increased, that is, resource utilization is increased if a quantity of spectrum resources is not increased.

However, among downlink data signals in the FDD system, RSs (Reference Signal, reference signal) are discretely inserted, and the reference signals need to be used in processing such as channel measurement, channel estimation, or data demodulation. Therefore, among the downlink data signals, both a transmit end and a receive end need to determine transmit powers for the reference signals.

Figure 3:
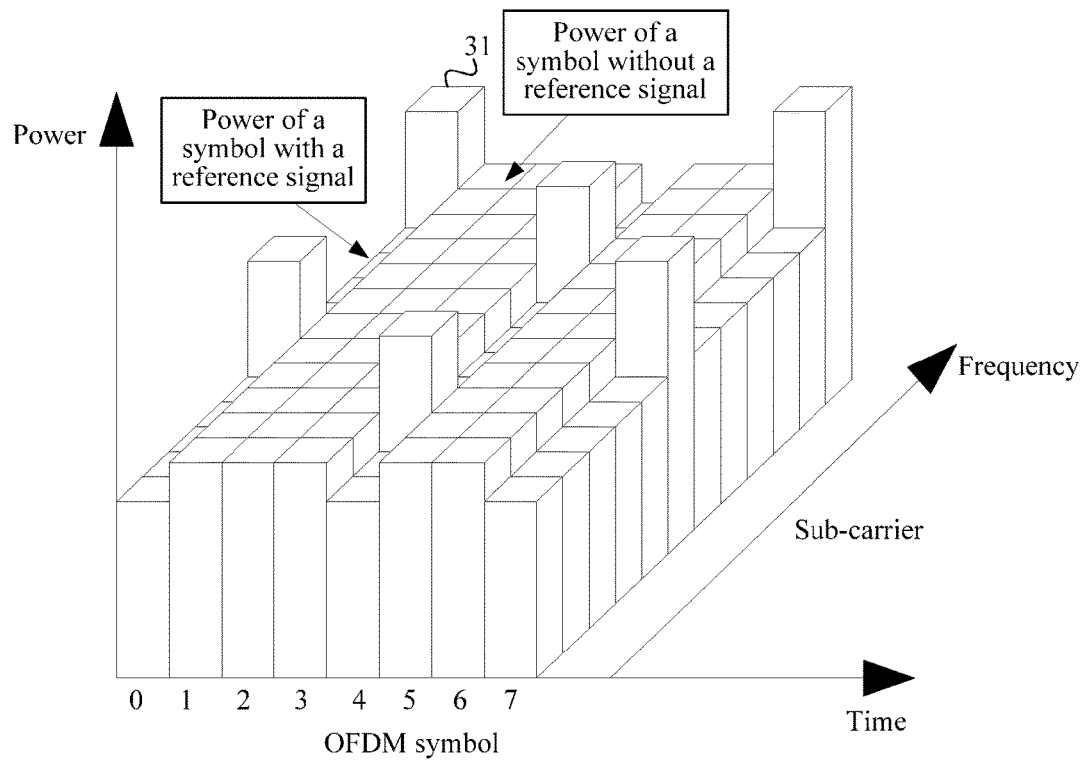
FIG. 3 is a schematic diagram of a signal power in a downlink subframe in an FDD system.

FIG. 3 is a schematic diagram of a signal power in a downlink subframe in an FDD system. As shown in FIG. 3, one subframe includes, in a time domain, eight orthogonal frequency division multiplexing (Orthogonal Frequency Division Multiplexing, OFDM) symbols numbered 0 to 7, and includes, in a frequency domain, 12 sub-carriers numbered 0 to 11. In a $0^{th}$ symbol and a fourth symbol, several reference signals 31 are inserted discretely. Sub-carriers, except those for the reference signals 31, in one subframe are used to send data signals. Transmit powers of a reference signal 31 may be different from that of a data signal. A transmit power of a data signal in an OFDM symbol that includes a reference signal 31 may also be different from a transmit power of a data signal in an OFDM symbol that does not include a reference signal 31. A base station sends a Pa parameter and a Pb parameter to user equipment (User Equipment, UE), to indicate a power of a data signal sent by the UE, the power of the data signal in the OFDM symbol that does not include the reference signal 31 may be obtained by using the Pa parameter, and the power of the data signal in the OFDM symbol that includes the reference signal 31 may be obtained by using the Pb parameter. It should be noted that, a quantity of OFDM symbols that one subframe includes in the time domain is not limited to that in the figure, and one subframe may include, in the time domain, N OFDM symbols numbered 0 to N−1.

When the DSS technology is used, both a downlink signal and an uplink signal may be sent in a same subframe. Therefore, a part of a total transmit power needs to be moved from a downlink frequency resource and provided for an uplink frequency resource to use, or a transmit power on an uplink frequency resource needs to be increased. The following embodiments of the present invention provide a power allocation method and a communications device, to resolve the foregoing problem. The communications device in the following embodiments of the present invention includes either of a base station and UE. The only difference between a first communications device and a second communications device is that the first communications device is configured to send a downlink signal, and the second communications device is configured to send an uplink signal.

Figure 4:
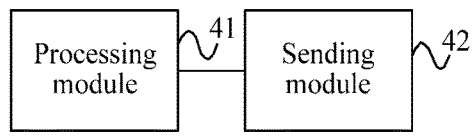
FIG. 4 is a schematic structural diagram of Embodiment 1 of a communications device according to an embodiment of the present invention.

FIG. 4 is a schematic structural diagram of Embodiment 1 of a communications device according to an embodiment of the present invention. As shown in FIG. 4, the communications device in this embodiment includes: a processing module 41 and a sending module 42.

The processing module 41 is configured to: determine a first power control parameter group, where the first power control parameter group includes information used to indicate a transmit power of the sending module 42 in a first-type subframe, and the sending module 42 sends a signal only on a downlink frequency resource in the first-type subframe. The processing module 41 determines a second power control parameter group, where the second power control parameter group includes information used to indicate a transmit power of the sending module 42 in a second-type subframe, and the sending module 42 sends signals on both a downlink frequency resource and an uplink frequency resource in the second-type subframe.

Specifically, the communications device provided in this embodiment is a first communications device, that is, the communications device provided in this embodiment is a communications device that sends a downlink signal. Generally, the communications device provided in this embodiment is a base station.

The communications device provided in this embodiment includes the processing module 41 and the sending module 42. The processing module 41 is configured to determine a first power control parameter group and the second power control parameter group. The first power control parameter group includes information used to indicate a transmit power of the sending module 42 in a first-type subframe, and the second power control parameter group includes information used to indicate a transmit power of the sending module 42 in a second-type subframe. The sending module 42 is configured to send the first-type subframe and the second-type subframe. The first-type subframe and the second-type subframe are two types of subframes that have different features. The sending module 42 sends a signal only on a preset downlink frequency resource in the first-type subframe, and the sending module 42 sends signals on both a downlink frequency resource and an uplink frequency resource that are preset in the second-type subframe.

Generally, in a DSS technology, a base station is allowed to send a downlink signal on an uplink frequency resource. Therefore, the communications device provided in this embodiment may be a base station to which the DSS technology is applied. However, the communications device provided in this embodiment is not limited to this, as long as a feature of a signal sent by the communications device satisfies the features of the first-type subframe and the second-type subframe, the communications device falls within a description scope of this embodiment. In this embodiment, the description is provided by using the DSS technology as an example.

When the DSS technology is used, the communications device that sends a downlink signal may send two types of subframes, where in one kind of subframe, a downlink signal may be sent only on a preset downlink frequency resource, and this kind of subframe is referred to as the first-type subframe; in the other kind of subframe, downlink signals may be sent on both an uplink frequency resource and a downlink frequency resource that are preset, and this kind of subframe is referred to as the second-type subframe. In the first-type subframe, a downlink signal is sent only on a preset downlink frequency resource, and therefore the communications device may use all transmit power to send a downlink signal on the downlink frequency resource. However, downlink signals may be sent on both the uplink frequency resource and the downlink frequency resource in the second-type subframe. Therefore, herein, there are two design schemes. In the first design scheme, it is considered that a rated maximum transmit power is generally defined for the communications device, and therefore the maximum transmit power needs to be allocated to the uplink frequency resource and the downlink frequency resource, and a transmit power is also separately configured for each of the uplink frequency resource and the downlink frequency resource in the second-type subframe, where a sum of the transmit powers on the uplink frequency resource and the downlink frequency resource in the second-type subframe is the same as a transmit power on the downlink frequency resource in the first-type subframe. In the other design scheme, an additional transmit power is allocated to the communications device to send a downlink signal on the uplink frequency resource in the second-type subframe. In this case, a transmit power at which the communications device sends a downlink signal on the downlink frequency resource in the second-type subframe is the same as a transmit power at which the communications device sends a downlink signal on the downlink frequency resource in the first-type subframe, and an additional transmit power is allocated to the uplink frequency resource in the second-type subframe to send a downlink signal.

According to the foregoing description, it can be known that as long as different transmit powers are defined for the communications device in different types of subframes, a signal can be sent by using a corresponding transmit power. Therefore, in this embodiment, the processing module 41 determines a first power control parameter group and a second power control parameter group, where the first power control parameter group and the second power control parameter group respectively include information used to indicate transmit powers of the sending module 42 in the first-type subframe and the second-type subframe, so that the sending module 42 can use corresponding transmit powers to send downlink signals in different types of subframes.

By means of the communications device provided in this embodiment, a first power control parameter group and a second power control parameter group are determined, where the first power control parameter group includes information used to indicate a transmit power of the communications device in a first-type subframe, and the second power control parameter group includes information used to indicate a transmit power of the communications device in a second-type subframe, the communications device sends a signal only on a preset downlink frequency resource in the first-type subframe, and the communications device sends signals on both a downlink frequency resource and an uplink frequency resource in the second-type subframe, so that the communications device can determine signal transmit powers in different types of subframes, and transmit powers of the communications device on an uplink frequency resource and a downlink frequency resource are coordinated.

Further, in the embodiment shown in FIG. 4, the first power control parameter group includes: information used to indicate a transmit power of the sending module 42 for a data signal in a symbol that includes a reference signal and that is in the first-type subframe, and information used to indicate a transmit power of the sending module 42 for a data signal in a symbol that does not include a reference signal and that is in the first-type subframe; or the first power control parameter group includes: information used to indicate a transmit power of the sending module 42 for a reference signal in the first-type subframe, information used to indicate a transmit power of the sending module 42 for a data signal in a symbol that includes a reference signal and that is in the first-type subframe, and information used to indicate a transmit power of the sending module 42 for a data signal in a symbol that does not include a reference signal and that is in the first-type subframe.

Specifically, the first power control parameter group includes information used to indicate a transmit power of the sending module 42 in a first-type subframe, and the sending module 42 sends a signal only on the preset downlink frequency resource in the first-type subframe. Therefore, the first power control parameter group only needs to include information used to indicate a transmit power of the sending module 42 on the downlink frequency resource in the first-type subframe. According to the schematic diagram of the signal power in the downlink subframe in the FDD system shown in FIG. 3, it can be known that, a symbol that includes a reference signal and a symbol that does not include a reference signal may exist in a downlink subframe. A transmit power for a reference signal is fixed, and therefore, in a symbol that includes a reference signal and a symbol that does not include a reference signal, transmit powers for data signals may be different. Therefore, the first power control parameter group needs to include at least information used to indicate a transmit power of the sending module 42 for a data signal in a symbol that includes a reference signal and that is in the first-type subframe, and information used to indicate a transmit power of the sending module 42 for a data signal in a symbol that does not include a reference signal and that is in the first-type subframe.

The reference signal is used in processing such as channel measurement, channel estimation, or data demodulation. Therefore, it needs to be ensured that the transmit power of the reference signal is greater than a threshold. Therefore, to ensure the transmit power for a reference signal in the first-type subframe, the power for a reference signal in the first-type subframe may be a preset value in the system. In this case, the first power control parameter group includes the information used to indicate a transmit power of the sending module 42 for a data signal in a symbol that includes a reference signal and that is in the first-type subframe, and the information used to indicate a transmit power of the sending module 42 for a data signal in a symbol that does not include a reference signal and that is in the first-type subframe. Another possibility is that, the transmit power for a reference signal in the first-type subframe is not preset in the system. In this case, the first power control parameter group includes: the information used to indicate a transmit power of the sending module 42 for a reference signal in the first-type subframe, information used to indicate a transmit power of the sending module 42 for a data signal in a symbol that includes a reference signal and that is in the first-type subframe, and the information used to indicate a transmit power of the sending module 42 for a data signal in a symbol that does not include a reference signal and that is in the first-type subframe.

Further, in the embodiment shown in FIG. 4, the sending module 42 sends signals on both the downlink frequency resource and the uplink frequency resource in the second-type subframe, and therefore the second power control parameter group determined by the processing module 41 further includes a third power control parameter group and a fourth power control parameter group. The third power control parameter group includes information used to indicate a transmit power of the sending module 42 on the downlink frequency resource in the second-type subframe, and the fourth power control parameter group includes information used to indicate a transmit power of the sending module 42 on the uplink frequency resource in the second-type subframe. In other words, the second power control parameter group includes indication information of at least two power control parameters that are respectively used to indicate the transmit powers of the sending module 42 on the uplink frequency resource and the downlink frequency resource in the second-type subframe.

According to the description in the embodiment shown in FIG. 4, it can be known that, when a transmit power at which the communications device sends a downlink signal is determined, there are two design schemes. In the first design scheme, the communications device has a same maximum transmit power in each subframe, and in the second-type subframe, the transmit power is allocated to the downlink frequency resource and the uplink frequency resource. The other design scheme is that, the communications device has a same transmit power on a downlink frequency resource in each subframe, and an additional transmit power is allocated to the uplink frequency resource in the second-type subframe to send a downlink signal. For the two different design schemes, designs of the first power control parameter group and the second power control parameter group are also different.

If it is considered that the maximum transmit power of the communications device remains unchanged, that is, the sending module 42 has a same maximum transmit power in each subframe, that is, the transmit power of the sending module 42 in the first-type subframe is equal to the transmit power of the sending module 42 in the second-type subframe, further, first of all, the transmit power for a reference signal on the downlink frequency resource in the second-type subframe needs to be the same as the transmit power for a reference signal in the first-type subframe, so that accuracy of channel estimation can be ensured. However, compared with the first-type subframe, in the second-type subframe, a partial transmit power further needs to be allocated to the uplink frequency resource for use, and therefore the transmit power for the data signal on the downlink frequency resource of the second-type subframe needs to be reduced. In this case, the processing module 41 needs to determine the third power control parameter group, where the third power control parameter group includes information used to indicate a transmit power of the sending module 42 for a data signal in a symbol that includes a reference signal and that is on the downlink frequency resource in the second-type subframe, and information used to indicate a transmit power of the sending module 42 for a data signal in a symbol that does not include a reference signal and that is on the downlink frequency resource in the second-type subframe.

The processing module 41 further needs to determine the fourth power control parameter group, where setting of the fourth power control parameter group is determined according to data transmitted on the uplink frequency resource in the second-type subframe. The sending module 42 may send only a data signal but not send a reference signal on the preset uplink frequency resource in the second-type subframe. Alternatively, the sending module 42 sends both a data signal and a reference signal on the uplink frequency resource in the second-type subframe. In the case in which the sending module 42 sends only a data signal but does not send a reference signal on the preset uplink frequency resource in the second-type subframe, considering that in each symbol in the second-type subframe, a reference signal can be sent on the downlink frequency resource only, the fourth power control parameter group may be set corresponding to the third power control parameter group. The transmit power for a data signal in each symbol in the fourth power control parameter group is in a fixed proportion to a transmit power for a data signal in a same symbol in a third power control parameter group. To simplify setting, a power at which the sending module 42 sends a data signal on the uplink frequency resource in the second-type subframe may be set to be the same as a power at which the sending module 42 sends a data signal on the downlink frequency resource in the second-type subframe. In this way, the fourth power control parameter group does not need to be set, and the third power control parameter group includes information used to indicate a transmit power of the sending module 42 for a data signal in a symbol that includes a reference signal and that is in the second-type subframe, and information used to indicate a transmit power of the sending module 42 for a data signal in a symbol that does not include a reference signal and that is in the second-type subframe. Alternatively, the fourth power control parameter group may be expressed in a manner of a ratio to the first power control parameter group or the third power control parameter group. For example, in the fourth power control parameter group, the transmit power for a data signal in the second-type subframe is expressed by using a proportion to the transmit power for a reference signal in the first-type subframe, or expressed by using a proportion to the transmit power for a data signal in a symbol that includes a reference signal and that is on the uplink frequency resource in the third-type subframe, or represented by using a proportion to the transmit power for a data signal in a symbol that does not include a reference signal and that is on the uplink frequency resource in the third-type subframe.

For the case in which the sending module 42 sends both a data signal and a reference signal on the uplink frequency resource in the second-type subframe, a channel environment of the uplink frequency resource is different from a channel environment of the downlink frequency resource, and therefore a new transmit power needs to be set for the reference signal sent by the sending module 42 on the uplink frequency resource in the second-type subframe. Therefore, the fourth power control parameter group includes: information used to indicate a transmit power of the sending module 42 for a reference signal on the uplink frequency resource in the second-type subframe, information used to indicate a transmit power of the sending module 42 for a data signal in a symbol that includes a reference signal and that is on the uplink frequency resource in the second-type subframe, and information used to indicate a transmit power of the sending module 42 for a data signal in a symbol that does not include a reference signal and that is on the uplink frequency resource in the second-type subframe.

In another aspect, if it is considered that the communications device has a same transmit power on a downlink frequency resource in each subframe, that is, the transmit power of the sending module 42 in the first-type subframe is equal to the transmit power of the sending module 42 on the downlink frequency resource in the second-type subframe, in this case, the third power control parameter group is the same as the first power control parameter group. Therefore, an additional transmit power needs to be added to the transmit power of the sending module 42 on the uplink frequency resource in the second-type subframe. Interference to the sending module 42 when the sending module 42 sends a downlink signal on the uplink frequency resource is less than interference to the sending module 42 when the sending module 42 sends a downlink signal on the downlink frequency resource. Therefore, the transmit power additionally allocated, on the uplink frequency resource in the second-type subframe, for the sending module 42 may be less than the transmit power on the downlink frequency resource.

The sending module 42 may send only a data signal but not send a reference signal on the preset uplink frequency resource in the second-type subframe. Alternatively, the sending module 42 sends both a data signal and a reference signal on the uplink frequency resource in the second-type subframe. For the fourth power control parameter group, if a reference signal is included on the uplink frequency resource in the second-type subframe, the fourth power control parameter group includes: information used to indicate a transmit power of the sending module 42 for a reference signal on the uplink frequency resource in the second-type subframe, or information used to indicate a transmit power of the sending module 42 for a reference signal on the uplink frequency resource in the second-type subframe and information used to indicate a difference from or a ratio to a transmit power of the sending module 42 for a reference signal in the first-type subframe. In other words, the transmit power of the sending module 42 for a reference signal on the uplink frequency resource in the second-type subframe is determined according to the transmit power of the sending module 42 for a reference signal in the first-type subframe. Generally, the transmit power of the sending module 42 for a reference signal on the uplink frequency resource in the second-type subframe is less than the transmit power of the sending module 42 for a reference signal in the first-type subframe. However, the transmit power of the sending module 42 for a data signal on the uplink frequency resource in the second-type subframe changes proportionally according to a proportion of the transmit power of the sending module 42 for a reference signal in the first-type subframe to the transmit power of the sending module 42 for a data signal in the first-type subframe. In other words, for the uplink frequency resource in the second-type subframe, by determining a transmit power for only one reference signal, transmit powers, on the uplink frequency resource in the second-type subframe, for a data signal in a symbol that includes a reference signal and for a data signal in a symbol that does not include a reference signal may be determined according to a reference signal in the first-type subframe and a proportion that is the same as a proportion of a transmit power for a data signal in a symbol that includes a reference signal to a transmit power for a data signal in a symbol that does not include a reference signal. Certainly, herein the fourth power control parameter group may further expressly include information used to indicate a transmit power of the sending module 42 for a reference signal on the uplink frequency resource in the second-type subframe, information used to indicate a transmit power of the sending module 42 for a data signal in a symbol that includes a reference signal and that is on the uplink frequency resource in the second-type subframe, and information used to indicate a transmit power of the sending module 42 for a data signal in a symbol that does not include a reference signal and that is on the uplink frequency resource in the second-type subframe. Alternatively, the information that is in the fourth power control parameter group and that is used to indicate a transmit power of the sending module 42 for a reference signal on the uplink frequency resource in the second-type subframe may be a difference from or a ratio to any one of other known power.

If a reference signal is not included on the uplink frequency resource in the second-type subframe, the fourth power control parameter group includes: the information used to indicate a transmit power of the sending module 42 for a data signal on the uplink frequency resource in the second-type subframe, or the information used to indicate a transmit power of the sending module 42 for a data signal on the uplink frequency resource in the second-type subframe and information used to indicate a difference from or a ratio to a transmit power of the sending module 42 for a data signal in the first-type subframe. In other words, the transmit power of the sending module 42 for a data signal on the uplink frequency resource in the second-type subframe is determined according to the transmit power of the sending module 42 for a data signal in the first-type subframe. Generally, the transmit power of the sending module 42 for a data signal on the uplink frequency resource in the second-type subframe is less than the transmit power of the sending module 42 for a data signal in the first-type subframe. Certainly, herein the fourth power control parameter group may further expressly include the information used to indicate a transmit power of the sending module 42 for a data signal on the uplink frequency resource in the second-type subframe. Alternatively, the information that is in the fourth power control parameter group and that is used to indicate a transmit power of the sending module 42 for a data signal on the uplink frequency resource in the second-type subframe may be a difference from or a ratio to any one of other known power parameters.

Further, in the embodiment shown in FIG. 4, the sending module 42 is further configured to: send the first power control parameter group to a second communications device; and send the second power control parameter group to the second communications device.

Specifically, after determining the first power control parameter group and the second power control parameter group, the processing module 41 further needs to send the first power control parameter group and the second power control parameter group to the second communications device by using the sending module 42. In this way, the second communications device learns signal transmit powers, in different types of subframes, of the communications device provided in this embodiment, so that the second communications device can better perform channel estimation, channel measurement, and data demodulation according to the signal transmit powers in subframes. The second communications device is generally UE, a relay station, a micro base station, or the like.

Figure 5:
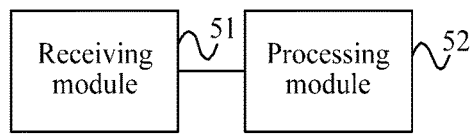
FIG. 5 is a schematic structural diagram of Embodiment 2 of a communications device according to an embodiment of the present invention.

FIG. 5 is a schematic structural diagram of Embodiment 2 of a communications device according to an embodiment of the present invention. As shown in FIG. 5, the communications device in this embodiment includes: a receiving module 51 and a processing module 52.

The receiving module 51 is configured to: receive a first power control parameter group sent by a first communications device, where the first power control parameter group includes information used to indicate a transmit power of the first communications device in a first-type subframe, and the first communications device sends a signal only on a preset downlink frequency resource in the first-type subframe; and receive a second power control parameter group sent by the first communications device, where the second power control parameter group includes information used to indicate a transmit power of the first communications device in a second-type subframe, and the first communications device sends signals on both a downlink frequency resource and an uplink frequency resource in the second-type subframe.

The processing module 52 is configured to: determine the transmit power of the first communications device in the first-type subframe; and determine the transmit power of the first communications device in the second-type subframe.

Specifically, the communications device provided in this embodiment is a second communications device, that is, the communications device provided in this embodiment is a communications device that receives a downlink signal. Generally, the communications device provided in this embodiment is UE, a relay station, a micro base station, or the like.

The communications device in this embodiment includes the receiving module 51 and the processing module 52, where the receiving module 51 is configured to receive the first power control parameter group and the second power control parameter group that are sent by the first communications device. The first power control parameter group includes information used to indicate a transmit power of the first communications device in a first-type subframe, and the second power control parameter group includes information used to indicate a transmit power of the first communications device in a second-type subframe. The first-type subframe and the second-type subframe are two types of subframes that have different features. The first communications device sends a signal only on a preset downlink frequency resource in the first-type subframe, and the first communications device sends signals on both a downlink frequency resource and an uplink frequency resource that are preset in the second-type subframe.

Generally, in a DSS technology, a base station is allowed to send a downlink signal on an uplink frequency resource. Therefore, the communications device involved in this embodiment may be a base station to which the DSS technology is applied. However, the first communications device involved in this embodiment is not limited to this, as long as a feature of a signal sent by the first communications device satisfies the features of the first-type subframe and the second-type subframe, the first communications device falls within a description scope of this embodiment. In this embodiment, description is provided by using the DSS technology as an example.

When the DSS technology is used, the first communications device that sends a downlink signal may send two types of subframes, where in one kind of subframe, a downlink signal may be sent only on a downlink frequency resource, and this kind of subframe is referred to as the first-type subframe; in the other kind of subframe, downlink signals may be sent on both an uplink frequency resource and a downlink frequency resource, and this kind of subframe is referred to as the second-type subframe. In the first-type subframe, a downlink signal is sent only on a downlink frequency resource, and therefore the first communications device may use all transmit power to send a downlink signal on the downlink frequency resource. However, downlink signals may be sent on both the uplink frequency resource and the downlink frequency resource in the second-type subframe. Therefore, herein, there are two design schemes. In the first design scheme, it is considered that a rated maximum transmit power is generally defined for the first communications device, and therefore the maximum transmit power needs to be allocated to the uplink frequency resource and the downlink frequency resource, and a transmit power is also separately configured for each of the uplink frequency resource and the downlink frequency resource in the second-type subframe, where a sum of the transmit powers on the uplink frequency resource and the downlink frequency resource in the second-type subframe is the same as a transmit power on the downlink frequency resource in the first-type subframe. In the other design scheme, an additional transmit power is allocated to the first communications device to send a downlink signal on the uplink frequency resource in the second-type subframe. In this case, a transmit power at which the first communications device sends a downlink signal on the downlink frequency resource in the second-type subframe is the same as a transmit power at which the first communications device sends a downlink signal on the downlink frequency resource in the first-type subframe, and an additional transmit power is allocated to the uplink frequency resource in the second-type subframe to send a downlink signal.

According to the foregoing description, it can be known that as long as different transmit powers are defined for the first communications device in different types of subframes, a signal can be sent by using a corresponding transmit power.

After the receiving module 51 receives the first power control parameter group and the second power control parameter group that are sent by the first communications device, the processing module 52 can determine the transmit power of the first communications device in a first-type subframe and the transmit power of the first communications device in a second-type subframe. Therefore, the communications device provided in this embodiment can complete channel measurement, channel estimation, and data demodulation according to transmit powers of the first communications device in subframes.

By means of the communications device provided in this embodiment, a first power control parameter group and a second power control parameter group that are sent by a first communications device is received, where the first power control parameter group includes information used to indicate a transmit power of the first communications device in a first-type subframe, and the second power control parameter group includes information used to indicate a transmit power of the first communications device in a second-type subframe, the first communications device sends a signal only on a preset downlink frequency resource in the first-type subframe, and the first communications device sends signals on both a downlink frequency resource and an uplink frequency resource in the second-type subframe, so that the communications device can determine signal transmit powers of the first communications device in different types of subframes, and can complete processing such as channel measurement, channel estimation, and data demodulation according to the signal transmit powers in different types of subframes.

Further, in the embodiment shown in FIG. 5, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

Further, in the embodiment shown in FIG. 5, the first communications device sends signals on both the downlink frequency resource and the uplink frequency resource in the second-type subframe, and therefore the second power control parameter group received by the receiving module 51 further includes a third power control parameter group and a fourth power control parameter group. The third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

Further, in the embodiment shown in FIG. 5, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

Further, in the embodiment shown in FIG. 5, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

Further, in the embodiment shown in FIG. 5, the transmit power of the first communications device in the first-type subframe is equal to the transmit power of the first communications device in the second-type subframe.

Further, in the embodiment shown in FIG. 5, the transmit power of the first communications device in the first-type subframe is equal to the transmit power of the first communications device on the downlink frequency resource in the second-type subframe; and the third power control parameter group is the same as the first power control parameter group.

Further, in the embodiment shown in FIG. 5, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

Figure 6:
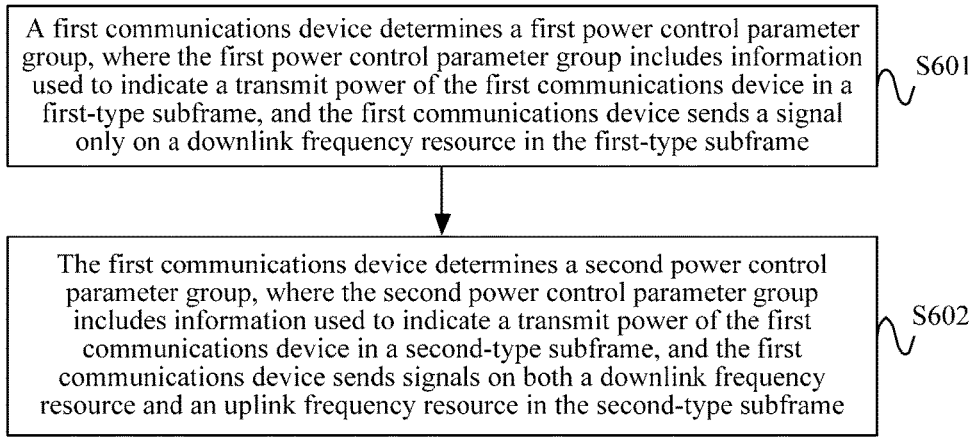
FIG. 6 is a flowchart of Embodiment 1 of a power allocation method according to an embodiment of the present invention.

FIG. 6 is a flowchart of Embodiment 1 of a power allocation method according to an embodiment of the present invention. As shown in FIG. 6, the method in this embodiment includes:

Step S601: A first communications device determines a first power control parameter group, where the first power control parameter group includes information used to indicate a transmit power of the first communications device in a first-type subframe, and the first communications device sends a signal only on a downlink frequency resource in the first-type subframe.

Step S602: The first communications device determines a second power control parameter group, where the second power control parameter group includes information used to indicate a transmit power of the first communications device in a second-type subframe, and the first communications device sends signals on both a downlink frequency resource and an uplink frequency resource in the second-type subframe.

It should be noted that, step S601 and step S602 are performed not in a fixed sequence, and generally step S601 and step S602 are simultaneously performed.

The power allocation method provided in this embodiment is used to complete processing of the communications device shown in FIG. 4. The implementation principle and technical effects are similar, and details are not described herein again.

Further, in the embodiment shown in FIG. 6, the second power control parameter group includes a third power control parameter group and a fourth power control parameter group, where the third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

Further, in the embodiment shown in FIG. 6, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

Further, in the embodiment shown in FIG. 6, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

Further, in the embodiment shown in FIG. 6, the transmit power of the first communications device in the first-type subframe is equal to the transmit power of the first communications device in the second-type subframe.

Further, in the embodiment shown in FIG. 6, the transmit power of the first communications device in the first-type subframe is equal to the transmit power of the first communications device on the downlink frequency resource in the second-type subframe; and the third power control parameter group is the same as the first power control parameter group.

Further, in the embodiment shown in FIG. 6, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

Further, in the embodiment shown in FIG. 6, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

Figure 7:
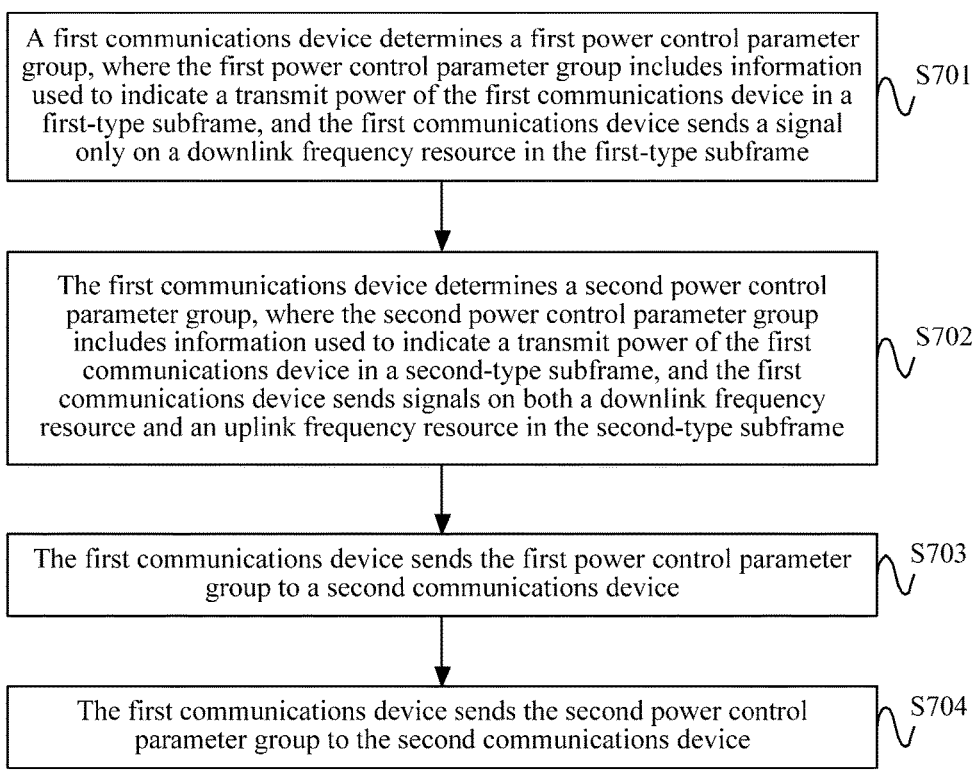
FIG. 7 is a flowchart of Embodiment 2 of a power allocation method according to an embodiment of the present invention.

FIG. 7 is a flowchart of Embodiment 2 of a power allocation method according to an embodiment of the present invention. As shown in FIG. 7, the method in this embodiment includes:

Step S701: A first communications device determines a first power control parameter group, where the first power control parameter group includes information used to indicate a transmit power of the first communications device in a first-type subframe, and the first communications device sends a signal only on a downlink frequency resource in the first-type subframe.

Step S702: The first communications device determines a second power control parameter group, where the second power control parameter group includes information used to indicate a transmit power of the first communications device in a second-type subframe, and the first communications device sends signals on both a downlink frequency resource and an uplink frequency resource in the second-type subframe.

Step S703: The first communications device sends the first power control parameter group to a second communications device.

Step S704: The first communications device sends the second power control parameter group to the second communications device.

It should be noted that, step S701 and step S702 are performed not in a fixed sequence, and generally step S701 and step S702 are simultaneously performed; step S703 and step S704 are performed not in a fixed sequence, and generally step S703 and step S704 are simultaneously performed.

Figure 8:
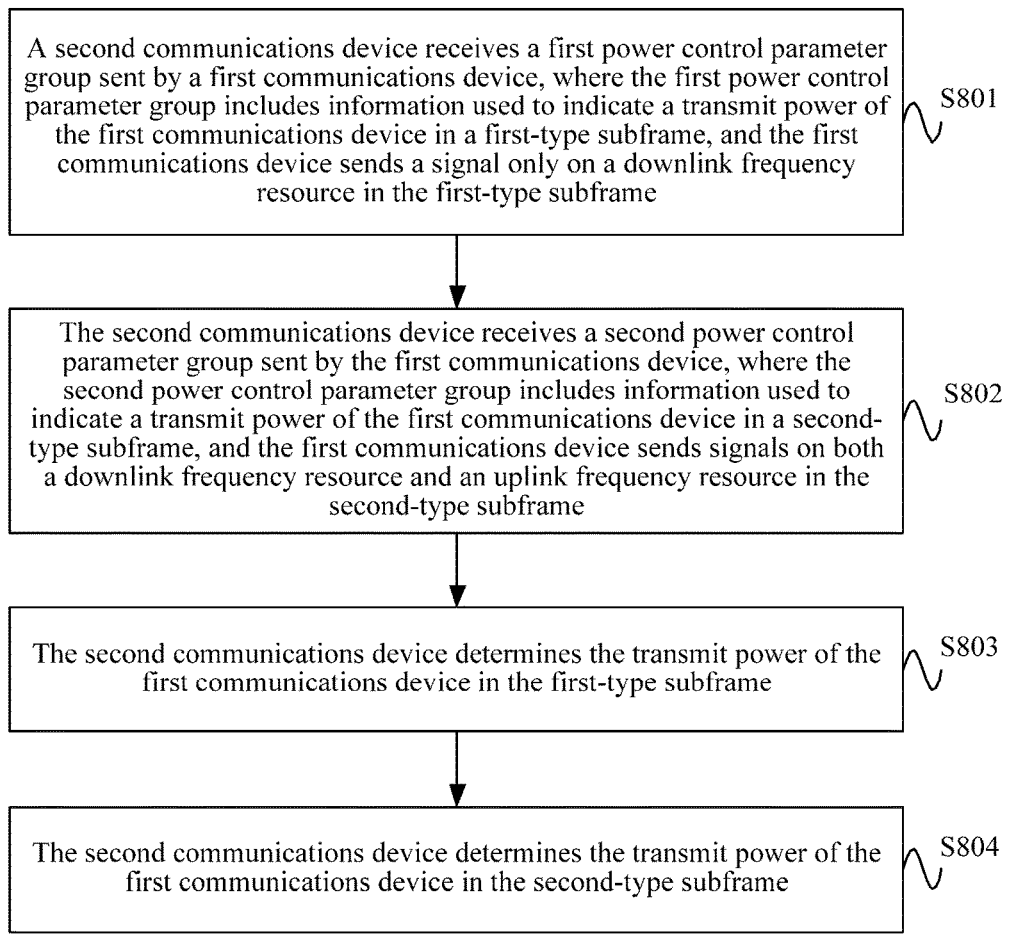
FIG. 8 is a flowchart of Embodiment 3 of a power allocation method according to an embodiment of the present invention.

FIG. 8 is a flowchart of Embodiment 3 of a power allocation method according to an embodiment of the present invention. As shown in FIG. 8, the method in this embodiment includes:

Step S801: A second communications device receives a first power control parameter group sent by a first communications device, where the first power control parameter group includes information used to indicate a transmit power of the first communications device in a first-type subframe, and the first communications device sends a signal only on a downlink frequency resource in the first-type subframe.

Step S802: The second communications device receives a second power control parameter group sent by the first communications device, where the second power control parameter group includes information used to indicate a transmit power of the first communications device in a second-type subframe, and the first communications device sends signals on both a downlink frequency resource and an uplink frequency resource in the second-type subframe.

Step S803: The second communications device determines the transmit power of the first communications device in the first-type subframe.

Step S804: The second communications device determines the transmit power of the first communications device in the second-type subframe.

The power allocation method provided in this embodiment is used to complete processing of the communications device shown in FIG. 5. The implementation principle and technical effects are similar, and details are not described herein again.

Further, in the embodiment shown in FIG. 8, the second power control parameter group includes a third power control parameter group and a fourth power control parameter group, where the third power control parameter group includes information used to indicate a transmit power of the first communications device on a downlink frequency resource in the second-type subframe, and the fourth power control parameter group includes information used to indicate a transmit power of the first communications device on an uplink frequency resource in the second-type subframe.

Further, in the embodiment shown in FIG. 8, the third power control parameter group includes information used to indicate a transmit power of the first communications device for a data signal in a symbol that includes a reference signal and that is on the downlink frequency resource in the second-type subframe, and information used to indicate a transmit power of the first communications device for a data signal in a symbol that does not include a reference signal and that is on the downlink frequency resource in the second-type subframe.

Further, in the embodiment shown in FIG. 8, if a reference signal is included on the uplink frequency resource in the second-type subframe, the fourth power control parameter group includes: information used to indicate a transmit power of the first communications device for a reference signal on the uplink frequency resource in the second-type subframe, information used to indicate a transmit power of the first communications device for a data signal in a symbol that includes a reference signal and that is on the uplink frequency resource in the second-type subframe, and information used to indicate a transmit power of the first communications device for a data signal in a symbol that does not include a reference signal and that is on the uplink frequency resource in the second-type subframe; or if a reference signal is not included at an uplink frequency in the second-type subframe, the fourth power control parameter group includes information used to indicate a transmit power of the first communications device for a data signal on the uplink frequency resource in the second-type subframe.

Further, in the embodiment shown in FIG. 8, the transmit power of the first communications device in the first-type subframe is equal to the transmit power of the first communications device in the second-type subframe.

Further, in the embodiment shown in FIG. 8, the transmit power of the first communications device in the first-type subframe is equal to the transmit power of the first communications device on the downlink frequency resource in the second-type subframe; and the third power control parameter group is the same as the first power control parameter group.

Further, in the embodiment shown in FIG. 8, if a reference signal is included on the uplink frequency resource in the second-type subframe, the fourth power control parameter group includes: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not included on the uplink frequency resource in the second-type subframe, the fourth power control parameter group includes: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

Further, in the embodiment shown in FIG. 8, the first power control parameter group includes: information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe; or the first power control parameter group includes: information used to indicate a transmit power of the first communications device for a reference signal in the first-type subframe, information used to indicate a transmit power of the first communications device for a data signal in a symbol that includes a reference signal and that is in the first-type subframe, and information used to indicate a transmit power of the first communications device for a data signal in a symbol that does not include a reference signal and that is in the first-type subframe.

It should be noted that, the sending module 42 in embodiments of the present invention may correspond to a transmitter of the communications device, or may correspond to a transceiver of the communications device. The processing module 41 may correspond to a processor of the communications device. Herein, the processor may be a central processing unit (Central Processing Unit, CPU), or an application specific integrated circuit (Application Specific Integrated Circuit, ASIC), or one or more integrated circuits that implement the embodiments of the present invention. The communications device may further include a memory, where the memory is configured to store instruction code, the processor invokes the instruction code in the memory, to control the processing module 41 and the sending module 42 in the embodiments of the present invention to perform the foregoing operations.

The receiving module 51 in the embodiments of the present invention may correspond to a receiver of the communications device, or may correspond to a transceiver of the communications device. The processing module 52 may correspond to a processor of the communications device. Herein, the processor may be a CPU, or an ASIC, or one or more integrated circuits that implement the embodiments of the present invention. The communications device may further include a memory, where the memory is configured to store instruction code, the processor invokes the instruction code in the memory, to control the receiving module 51 and the processing module 52 in the embodiments of the present invention to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A communications device, comprising:
    a processor; and
    a transmitter, wherein
    the processor is configured to: determine a first power control parameter group, wherein the first power control parameter group comprises information used to indicate a transmit power of the transmitter in a first-type subframe, and the transmitter transmits a signal only on a preset downlink frequency resource in the first-type subframe; and determine a second power control parameter group, wherein the second power control parameter group comprises information used to indicate a transmit power of the transmitter in a second-type subframe, and the transmitter transmits signals on both a downlink frequency resource and an uplink frequency resource that are preset in the second-type subframe, wherein the second power control parameter group comprises a third power control parameter group and a fourth power control parameter group, wherein the third power control parameter group comprises information used to indicate a transmit power of the transmitter on a downlink frequency resource in the second-type subframe, and the fourth power control parameter group comprises information used to indicate a transmit power of the transmitter on an uplink frequency resource in the second-type subframe.

2. The communications device according to claim 1, wherein the third power control parameter group comprises information used to indicate a transmit power of the transmitter for a data signal in a symbol that comprises a reference signal and that is on the downlink frequency resource in the second-type subframe, and information used to indicate a transmit power of the transmitter for a data signal in a symbol that does not comprise a reference signal and that is on the downlink frequency resource in the second-type subframe.

3. The communications device according to claim 1, wherein if a reference signal is comprised on the uplink frequency resource in the second-type subframe, the fourth power control parameter group comprises: information used to indicate a transmit power of the transmitter for a reference signal on the uplink frequency resource in the second-type subframe, information used to indicate a transmit power of the transmitter for a data signal in a symbol that comprises a reference signal and that is on the uplink frequency resource in the second-type subframe, and information used to indicate a transmit power of the transmitter for a data signal in a symbol that does not comprise a reference signal and that is on the uplink frequency resource in the second-type subframe; or
    if a reference signal is not comprised at an uplink frequency resource in the second-type subframe, the fourth power control parameter group comprises information used to indicate a transmit power of the transmitter for a data signal on the uplink frequency resource in the second-type subframe.

4. The communications device according to claim 1, wherein the transmit power of the transmitter in the first-type subframe is equal to the transmit power of the transmitter in the second-type subframe.

5. The communications device according to claim 1, wherein the transmit power of the transmitter in the first-type subframe is equal to the transmit power of the transmitter on the downlink frequency resource in the second-type subframe; and
    the third power control parameter group is the same as the first power control parameter group.

6. The communications device according to claim 5, wherein if a reference signal is comprised on the uplink frequency resource in the second-type subframe, the fourth power control parameter group comprises: the information used to indicate a transmit power of the transmitter for a reference signal on the uplink frequency resource in the second-type subframe, or the information used to indicate a transmit power of the transmitter for a reference signal on the uplink frequency resource in the second-type subframe and information used to indicate a difference from or a ratio to a transmit power of the transmitter for a reference signal in the first-type subframe; or
    if a reference signal is not comprised on the uplink frequency resource in the second-type subframe, the fourth power control parameter group comprises: the information used to indicate a transmit power of the transmitter for a data signal on the uplink frequency resource in the second-type subframe, or the information used to indicate a transmit power of the transmitter for a data signal on the uplink frequency resource in the second-type subframe and information used to indicate a difference from or a ratio to a transmit power of the transmitter for a data signal in the first-type subframe.

7. The communications device according to claim 1, wherein the first power control parameter group comprises: information used to indicate a transmit power of the transmitter for a data signal in a symbol that comprises a reference signal and that is in the first-type subframe, and information used to indicate a transmit power of the transmitter for a data signal in a symbol that does not comprise a reference signal and that is in the first-type subframe; or
    the first power control parameter group comprises: information used to indicate a transmit power of the transmitter for a reference signal in the first-type subframe, information used to indicate a transmit power of the transmitter for a data signal in a symbol that comprises a reference signal and that is in the first-type subframe, and information used to indicate a transmit power of the transmitter for a data signal in a symbol that does not comprise a reference signal and that is in the first-type subframe.

8. The communications device according to of claim 1, wherein the transmitter is further configured to: send the first power control parameter group to a second communications device; and send the second power control parameter group to the second communications device.

9. A communications device, comprising:
    a receiver, configured to: receive a first power control parameter group sent by a first communications device, wherein the first power control parameter group comprises information used to indicate a transmit power of the first communications device in a first-type subframe, and the first communications device sends a signal only on a downlink frequency resource in the first-type subframe; and receive a second power control parameter group sent by the first communications device, wherein the second power control parameter group comprises information used to indicate a transmit power of the first communications device in a second-type subframe, and the first communications device sends signals on both a downlink frequency resource and an uplink frequency resource in the second-type subframe; and a processor, configured to: determine the transmit power of the first communications device in the first-type subframe; and determine the transmit power of the first communications device in the second-type subframe, wherein the second power control parameter group comprises a third power control parameter group and a fourth power control parameter group, wherein the third power control parameter group comprises information used to indicate a transmit power of the first communications device on a downlink frequency resource in the second-type subframe, and the fourth power control parameter group comprises information used to indicate a transmit power of the first communications device on an uplink frequency resource in the second-type subframe.

10. The communications device according to claim 9, wherein the third power control parameter group comprises information used to indicate a transmit power of the first communications device for a data signal in a symbol that comprises a reference signal and that is on the downlink frequency resource in the second-type subframe, and information used to indicate a transmit power of the first communications device for a data signal in a symbol that does not comprise a reference signal and that is on the downlink frequency resource in the second-type subframe.

11. The communications device according to claim 9, wherein if a reference signal is comprised on the uplink frequency resource in the second-type subframe, the fourth power control parameter group comprises: information used to indicate a transmit power of the first communications device for a reference signal on the uplink frequency resource in the second-type subframe, information used to indicate a transmit power of the first communications device for a data signal in a symbol that comprises a reference signal and that is on the uplink frequency resource in the second-type subframe, and information used to indicate a transmit power of the first communications device for a data signal in a symbol that does not comprise a reference signal and that is on the uplink frequency resource in the second-type subframe; or if a reference signal is not comprised at an uplink frequency in the second-type subframe, the fourth power control parameter group comprises information used to indicate a transmit power of the first communications device for a data signal on the uplink frequency resource in the second-type subframe.

12. The communications device according to claim 9, wherein the transmit power of the first communications device in the first-type subframe is equal to the transmit power of the first communications device in the second-type subframe.

13. The communications device according to claim 9, wherein the transmit power of the first communications device in the first-type subframe is equal to the transmit power of the first communications device on the downlink frequency resource in the second-type subframe; and the third power control parameter group is the same as the first power control parameter group.

14. The communications device according to claim 13, wherein if a reference signal is comprised on the uplink frequency resource in the second-type subframe, the fourth power control parameter group comprises: the information used to indicate a transmit power of the first communications device for a reference signal on the uplink frequency resource in the second-type subframe, or the information used to indicate a transmit power of the first communications device for a reference signal on the uplink frequency resource in the second-type subframe and information used to indicate a difference from or a ratio to a transmit power of the first communications device for a reference signal in the first-type subframe; or if a reference signal is not comprised on the uplink frequency resource in the second-type subframe, the fourth power control parameter group comprises: the information used to indicate a transmit power of the first communications device for a data signal on the uplink frequency resource in the second-type subframe, or the information used to indicate a transmit power of the first communications device for a data signal on the uplink frequency resource in the second-type subframe and information used to indicate a difference from or a ratio to a transmit power of the first communications device for a data signal in the first-type subframe.

15. The communications device according to claim 9, wherein the first power control parameter group comprises: information used to indicate a transmit power of the first communications device for a data signal in a symbol that comprises a reference signal and that is in the first-type subframe, and information used to indicate a transmit power of the first communications device for a data signal in a symbol that does not comprise a reference signal and that is in the first-type subframe; or the first power control parameter group comprises: information used to indicate a transmit power of the first communications device for a reference signal in the first-type subframe, information used to indicate a transmit power of the first communications device for a data signal in a symbol that comprises a reference signal and that is in the first-type subframe, and information used to indicate a transmit power of the first communications device for a data signal in a symbol that does not comprise a reference signal and that is in the first-type subframe.

16. A power allocation method, comprising:
determining, by a first communications device, a first power control parameter group, wherein
the first power control parameter group comprises information used to indicate a transmit power of the first communications device in a first-type subframe, and sending, by the first communications device, a signal only on a downlink frequency resource in the first-type subframe; and
determining, by the first communications device, a second power control parameter group, wherein the second power control parameter group comprises information used to indicate a transmit power of the first communications device in a second-type subframe, and sending, by the first communications device, signals on both a downlink frequency resource and an uplink frequency resource in the second-type subframe, wherein the second power control parameter group comprises a third power control parameter group and a fourth power control parameter group, wherein the third power control control parameter group comprises information used to indicate a transmit power of the first communications device on a downlink frequency resource in the second-type subframe, and the fourth power control parameter group comprises information used to indicate a transmit power of the first communications device on an uplink frequency resource in the second-type subframe.

17. The method according to claim 16, wherein the third power control parameter group comprises information used to indicate a transmit power of the first communications device for a data signal in a symbol that comprises a reference signal and that is on the downlink frequency resource in the second-type subframe, and information used to indicate a transmit power of the first communications device for a data signal in a symbol that does not comprise a reference signal and that is on the downlink frequency resource in the second-type subframe.

* * * * *